US012069446B2

(12) United States Patent
Xiong

(10) Patent No.: US 12,069,446 B2
(45) Date of Patent: Aug. 20, 2024

(54) AUDIO PROCESSING CIRCUIT, CAR-MOUNTED PLAYER, AND WIRELESS PLAYBACK SYSTEM

(71) Applicant: SHENZHEN JIEMEISI INDUSTRIAL CO., LTD., Shenzhen (CN)

(72) Inventor: Pan Xiong, Shenzhen (CN)

(73) Assignee: SHENZHEN JIEMEISI INDUSTRIAL CO., LTD., Shenzhen (CN)

( * ) Notice: Subject to any disclaimer, the term of this patent is extended or adjusted under 35 U.S.C. 154(b) by 0 days.

(21) Appl. No.: 18/098,084

(22) Filed: Jan. 17, 2023

(65) Prior Publication Data
US 2024/0171906 A1 May 23, 2024

(30) Foreign Application Priority Data
Nov. 18, 2022 (CN) .................. 202211444357.X

(51) Int. Cl.
*H04R 3/00* (2006.01)
*H04B 1/034* (2006.01)
*H04B 1/3822* (2015.01)

(52) U.S. Cl.
CPC .............. *H04R 3/00* (2013.01); *H04B 1/034* (2013.01); *H04B 1/3822* (2013.01); *H04R 2420/07* (2013.01)

(58) Field of Classification Search
CPC ...... H04R 3/00; H04R 2420/07; H04B 1/034; H04B 1/3822

(Continued)

(56) References Cited

U.S. PATENT DOCUMENTS 4,905,284 A 2/1990 Kwang
2017/0118580 A1* 4/2017 Tian ..................... H04W 4/80

FOREIGN PATENT DOCUMENTS

CN 201018477 Y 2/2008
CN 208401829 U 1/2019
(Continued)

OTHER PUBLICATIONS

International Search Report issued in corresponding International application No. PCT/CN2023/092728, mailed Sep. 4, 2023.
(Continued)

*Primary Examiner* — Eugene Yun

(57) ABSTRACT

The present disclosure illustrates an audio processing circuit, a car-mounted player, and a wireless playback system. The audio processing circuit includes: a signal acquisition module including a wireless input module and/or a wired input module, where the wireless input module is configured to receive an audio signal based on a wireless technology, and the wired input module is configured to receive the audio signal based on a wired technology; an audio processing module, configured to process the audio signal received by the signal acquisition module to improve sound quality of the audio signal; a frequency modulation (FM) transmitter module, configured to perform FM transmission on the audio signal output by the audio processing module; and a power supply module, configured to supply power to the signal acquisition module, the audio processing module and the FM transmitter module.

16 Claims, 8 Drawing Sheets

(58) Field of Classification Search
USPC .................................................... 455/569.1
See application file for complete search history.

(56) References Cited

FOREIGN PATENT DOCUMENTS

| | | |
|---|---|---|
| CN | 115734207 A | 3/2023 |
| KR | 20020010350 A | 2/2002 |

OTHER PUBLICATIONS

Written Opinion of the International Search Authority in corresponding International application No. PCT/CN2023/092728, mailed Sep. 4, 2023.

\* cited by examiner

AUDIO PROCESSING CIRCUIT, CAR-MOUNTED PLAYER, AND WIRELESS PLAYBACK SYSTEM

TECHNICAL FIELD

The subject matter herein generally relates to an audio technology field, in particular, relates to an audio processing circuit, a car-mounted player, and a wireless playback system.

BACKGROUND

Currently, car-mounted players are connected to a mobile device by Bluetooth. An audio signal of the mobile device is transmitted to a Bluetooth master control chip of the car-mounted player, and then the audio signal is transmitted to a Frequency Modulation (FM) transmitter chip after being decoded by the Bluetooth master control chip and converted by a digital-to-analog conversion. The FM transmitter chip wirelessly performs a FM operation on the audio signal and sends the audio signal to a car-mounted radio, so that the car-mounted radio is able to wirelessly play music from the mobile device and perform call function of the mobile device. Since by above technology, the audio signal is first transmitted from the mobile device to the Bluetooth master control chip by Bluetooth, then transmitted from the Bluetooth master control chip to the FM transmitter chip, and finally transmitted from the FM transmitter chip to the car-mounted radio, thus, the audio signal is damaged and weakened after undergoing multiple path transitions. As a result, the audio signal received by the car-mounted radio has large distortion and high noise, and a sound quality of the music played by the car-mounted radio is unacceptable, which has brought great troubles to users, and further brought poor user experience for listening to music and making calls.

SUMMARY

For an existing car-mounted player, when the car-mounted radio wirelessly plays the music of the mobile device and performs call function of the mobile device, an audio signal from the existing car-mounted player is damaged and weakened after the audio signal undergoing multiple path transitions, causing a technical problem that the audio signal received by a car-mounted radio has large distortion and high noise, it is necessary to provide an audio processing circuit, a car-mounted player, and a wireless playback system to solve the technical problem.

The present disclosure provides an audio processing circuit, and the audio processing circuit includes:
- a signal acquisition module including a wireless input module and/or a wired input module, wherein the wireless input module is configured to receive an audio signal based on a wireless technology, and the wired input module is configured to receive the audio signal based on a wired technology;
- an audio processing module, configured to process the audio signal received by the signal acquisition module to improve sound quality of the audio signal;
- a frequency modulation (FM) transmitter module, configured to perform FM transmission on the audio signal output by the audio processing module;
- a power supply module, configured to supply power to the signal acquisition module, the audio processing module and the FM transmitter module.

The present disclosure further provides a car-mounted player, the car-mounted player includes an audio processing circuit, the audio processing circuit includes:
- a signal acquisition module including a wireless input module and/or a wired input module, where the wireless input module is configured to receive an audio signal based on a wireless technology, and the wired input module is configured to receive the audio signal based on a wired technology;
- an audio processing module, configured to process the audio signal received by the signal acquisition module to improve sound quality of the audio signal;
- a frequency modulation (FM) transmitter module, configured to perform FM transmission on the audio signal output by the audio processing module;
- a power supply module, configured to supply power to the signal acquisition module, the audio processing module, and the FM transmitter module.

The present disclosure further provides a wireless playback system, the wireless playback system includes an audio processing circuit, the audio processing circuit includes:
- a signal acquisition module including a wireless input module and/or a wired input module, where the wireless input module is configured to receive an audio signal based on a wireless technology, and the wired input module is configured to receive the audio signal based on a wired technology;
- an audio processing module, configured to process the audio signal received by the signal acquisition module to improve sound quality of the audio signal;
- a frequency modulation (FM) transmitter module, configured to perform FM transmission on the audio signal output by the audio processing module;
- a power supply module, configured to supply power to the signal acquisition module, the audio processing module and the FM transmitter module.

The present disclosure further provides a transportation device, the transportation device includes an audio processing circuit, the audio processing circuit includes:
- a signal acquisition module including a wireless input module and/or a wired input module, where the wireless input module is configured to receive an audio signal based on a wireless technology, and the wired input module is configured to receive the audio signal based on a wired technology;
- an audio processing module, configured to process the audio signal received by the signal acquisition module to improve sound quality of the audio signal;
- a frequency modulation (FM) transmitter module, configured to perform FM transmission on the audio signal output by the audio processing module;
- a power supply module, configured to supply power to the signal acquisition module, the audio processing module and the FM transmitter module.

In the audio processing circuit of the present disclosure, the wireless module receives the audio signal based on wireless technology, the audio processing module processes the audio signal received by the wireless module to improve sound quality, and the FM transmitter module performs FM transmission on the audio signal output by the audio processing module, therefore realizing an optimization of the audio signal by the audio processing module before the audio signal is input the FM transmitter module, and improving a quality of the audio signal received by the car-mounted radio, greatly improving a sound quality of the audio played by the car-mounted radio, and improving user experience.

BRIEF DESCRIPTION OF THE DRAWINGS

In order to more clearly illustrate technical solutions in the embodiments of the present disclosure or the prior art, following description will briefly introduce accompanying drawings used in the description of the present embodiments or the prior art. Obviously, the drawings in the following description are only some embodiments of the present disclosure, and those skilled in the art can obtain other drawings based on the drawings without creative work.

DETAILED DESCRIPTION

A technical solution in the embodiments of the present disclosure will be clearly and completely described below in conjunction with the drawings in the embodiments of the present disclosure. Apparently, the described embodiments are only partial embodiments of the present disclosure, not including all embodiments. Based on the embodiments of the present disclosure, all other embodiments obtained by persons with ordinary skill in the art without creative work belong to a protection scope of the present disclosure.

Figure 1:
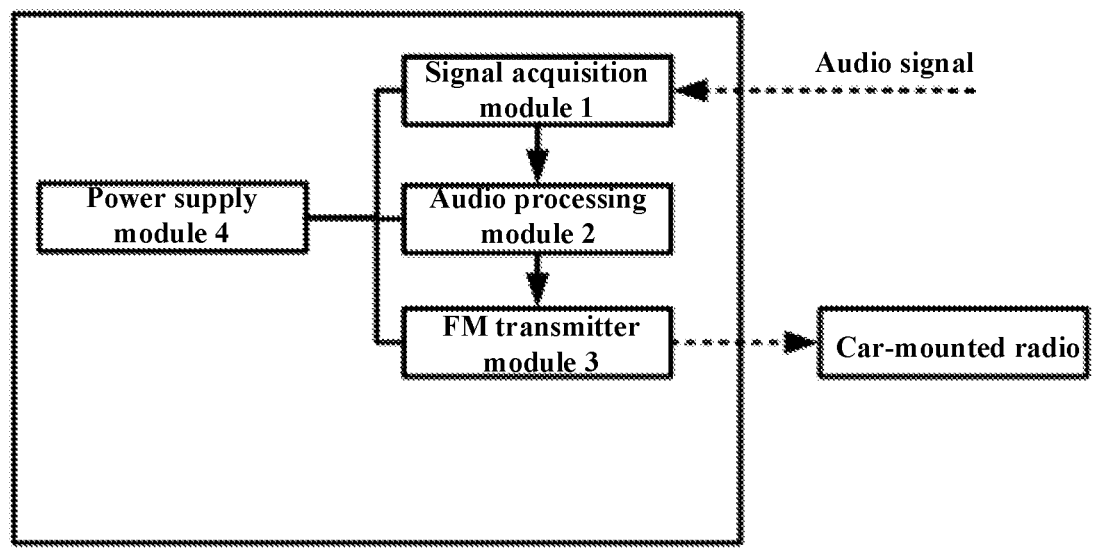
FIG. 1 is a block diagram of one embodiment of an audio processing circuit.

FIG. 1 illustrates one embodiment of an audio processing circuit. The audio processing circuit includes a signal acquisition module 1, an audio processing module 2, a FM transmitter module 3, and a power supply module 4.

The signal acquisition module 1 is a wireless input module and/or a wired input module. The wireless input module receives an audio signal based on a wireless technology, and the wired input module is configured to receive the audio signal based on a wired technology.

The audio processing module 2 is configured to process the audio signal received by the signal acquisition module 1 to improve sound quality of the audio signal.

The FM transmitter module 3 is configured to perform FM transmission on the audio signal output by the audio processing module 2.

The power supply module 4 is configured to supply power to the signal acquisition module 1, the audio processing module 2 and the FM transmitter module 3.

The present embodiment realizes an optimization of the audio signal by the audio processing module 2 before the audio signal is input the FM transmitter module 3, therefore improving a quality of the audio signal received by the car-mounted radio, greatly improving a sound quality of the audio played by the car-mounted radio, and improving user experience.

In one embodiment, a signal receiving mode of the wired input module includes one or more of receiving signals by a U disk, a TF card, a USB interface, a TYPE-C interface and a TYPE-B interface. The wired input module is configured to receive the audio signal, and then input the audio signal to the audio processing module 2. In one embodiment, the wireless input module includes a wireless module, and the wireless module is configured to receive the audio signal based on a wireless technology.

It can be understood that parameters of components (such as resistors and capacitors) in present disclosure can be calibrated by a limited number of experiments, which not be described in detail.

It can be understood that, in order to better describe the solution of the present disclosure, the audio processing circuit is divided into multiple modules (e.g., a wireless module, the audio processing module 2, the FM transmitter module 3, the power supply module 4). In an actual product with the audio processing circuit, the above modules are set on at least one circuit board.

In one embodiment, the wireless module includes a wireless master control chip and supporting circuits of the wireless master control chip. The wireless module is configured to receive the audio signal based on the wireless technology.

Figure 6:
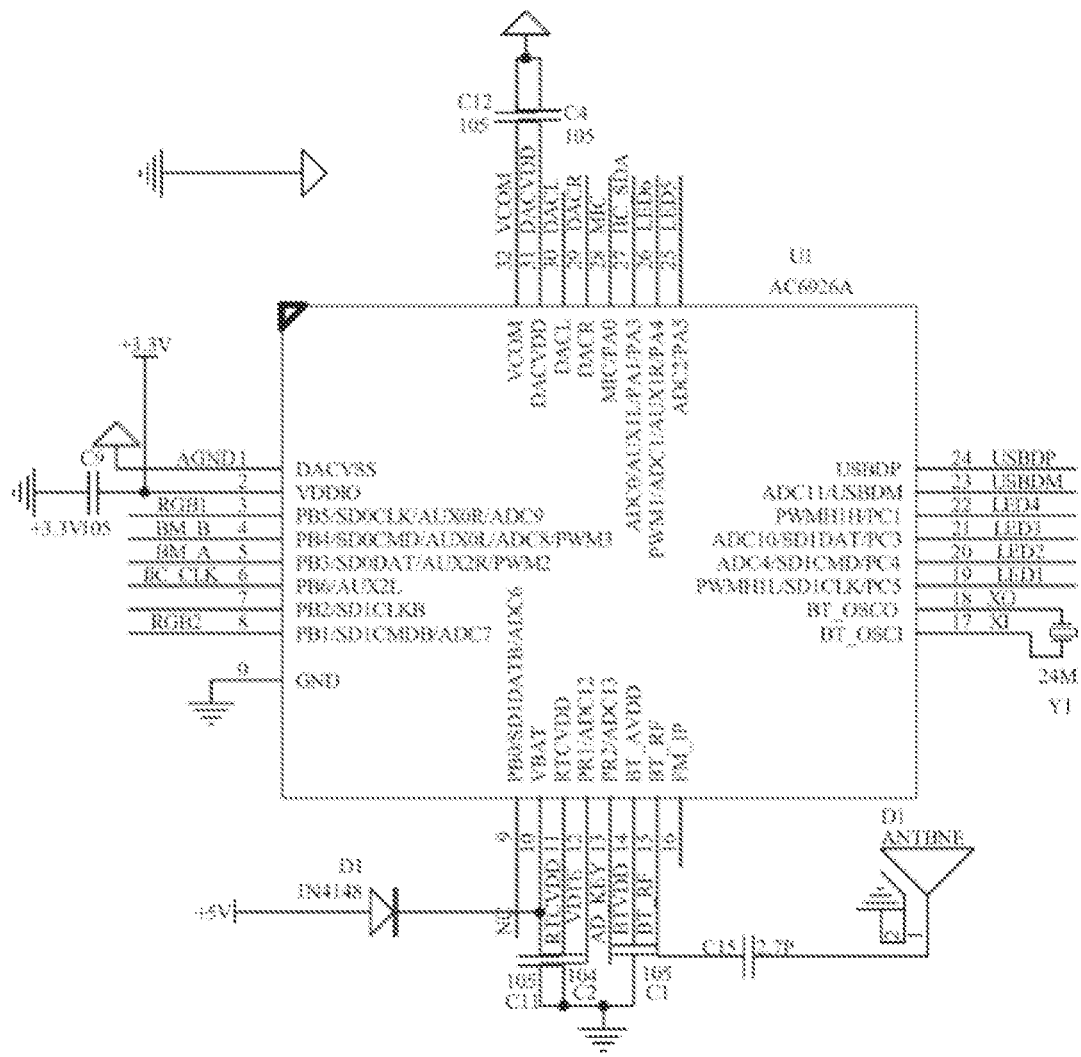
FIG. 6 is a circuit schematic diagram of one embodiment of a wireless module in the audio processing circuit.

FIG. 6 illustrates the wireless module. Referring to FIG. 6, U1 is the wireless master control chip, and Y1 is a crystal oscillator, and C9, C12, C4, C1, C2, and C11 are capacitors, D1 IN4148 is a diode for voltage reduction, and D1 ANTBNE is a wireless antenna.

In one embodiment, the wireless master control chip can be existed wireless master control chip, which is not limited here. The supporting circuits of the wireless master control chip are set according to requirements of the wireless master control chip, and will not be described here.

Optionally, the audio processing module 2 includes a first processing submodule. In one embodiment, the first processing submodule directly processes the audio signal received by the wireless module.

Optionally, the audio processing module 2 includes a first processing submodule and a second processing submodule. In one embodiment, the second processing submodule performs current amplification on the audio signal received by the wireless module, and the first processing submodule processes the audio signal output by the second processing submodule to improve the sound quality of the audio signal. It can be understood that, at this time, the first processing submodule does not directly obtain the audio signal from the wireless module.

The FM transmitter module 3 includes a FM (Frequency Modulation) transmitter chip and supporting circuits of the FM transmitter chip. The supporting circuits of the FM transmitter chip are set according to requirements of the FM transmitter chip, which will not be described in detail. The FM transmitter chip is a chip used for performing FM frequency modulation and sending FM signal.

The power supply module 4 includes a DC (Direct Current)-DC (Direct Current) device. The DC-DC device is a device that converts electric energy of one voltage value into electric energy of another voltage value in a direct current circuit, and the DC-DC device uses microelectronics technology to assemble small surface-mounted integrated circuits and microelectronic components into one body. The power supply module 4 provides DC power supply of 5V to the wireless module, the audio processing module 2 and the FM transmitter module 3.

It can be understood that other DC-DC devices can also be selected from DC-DC devices of the prior art, which is not limited here.

In one embodiment, the wireless input module is a wireless module, and the wireless module is configured to receive the audio signal based on the Bluetooth technology. The audio processing module 2 includes a first processing submodule.

The first processing submodule includes a signal frequency division unit, a frequency division adjustment unit, and an amplification and combination unit.

The signal frequency division unit is electrically connected to the power supply module 4 and the wireless module, and the signal frequency division unit is configured to perform frequency division of the audio signal received by the wireless module.

The frequency division adjustment unit includes at least one subunit of a treble adjustment subunit, a bass adjustment subunit, and a midrange adjustment subunit. In one embodiment, the treble adjustment subunit is configured to adjust a high frequency signal obtained by a frequency division of the signal frequency division unit, and the bass adjustment subunit is configured to adjust a low frequency signal obtained by the frequency division of the signal frequency division unit, and the midrange adjustment subunit is configured to adjust an intermediate frequency signal obtained by the frequency division of the signal frequency division unit.

The amplification and combination unit includes an amplification and combination chip U5 and a voltage division subunit. The amplification and combination chip U5 is electrically connected to the frequency division adjustment unit, the FM transmitter module 3 and the power supply module 4, and the amplification and combination chip U5 is used to amplify and combine signals output by the frequency division adjustment unit, and output the signals to the FM transmitter module 3.

The voltage division subunit includes a first resistor R19. An eighth pin of the amplification and combination chip U5 is electrically connected to a first end of the first resistor R19, and a second end of the first resistor R19 is electrically connected to the power supply module 4. In one embodiment, the eighth pin of the amplification and combination chip U5 is configured to provide a reference power supply (that is VDD).

In one embodiment, the frequency division of the audio signal received by the wireless module is carried out by the signal frequency division unit to determine signals with different frequencies, and then the signals with different frequencies divided by the signal frequency division unit are adjusted by the frequency division adjustment unit, therefore realizing an optimization of the audio signal by the audio processing module 2 before the audio signal is input the FM transmitter module 3, and improving the quality of the audio signal received by the car-mounted radio, and greatly improving the sound quality of the audio played by the car-mounted radio, and improving user experience. Moreover, independent adjustments are made for high frequency signals, intermediate frequency signals, and low frequency signals, which is conducive to improving an accuracy of adjustment, and is beneficial for the signal transmitting from the FM transmitter module 3 to the car-mounted radio to be more in line with user's individual needs, further improving user experience.

The amplification and combination chip U5 can be a chip that realizes signal amplification and combines amplified simultaneous signals, for example, HG5532 operational amplifier chip.

In one embodiment, the first resistor R19 includes a resistor, for example, a pure resistor.

The signal frequency division unit is configured to divide the audio signal received by the wireless module into a high frequency signal, a low frequency signal and an intermediate frequency signal.

Figure 2:
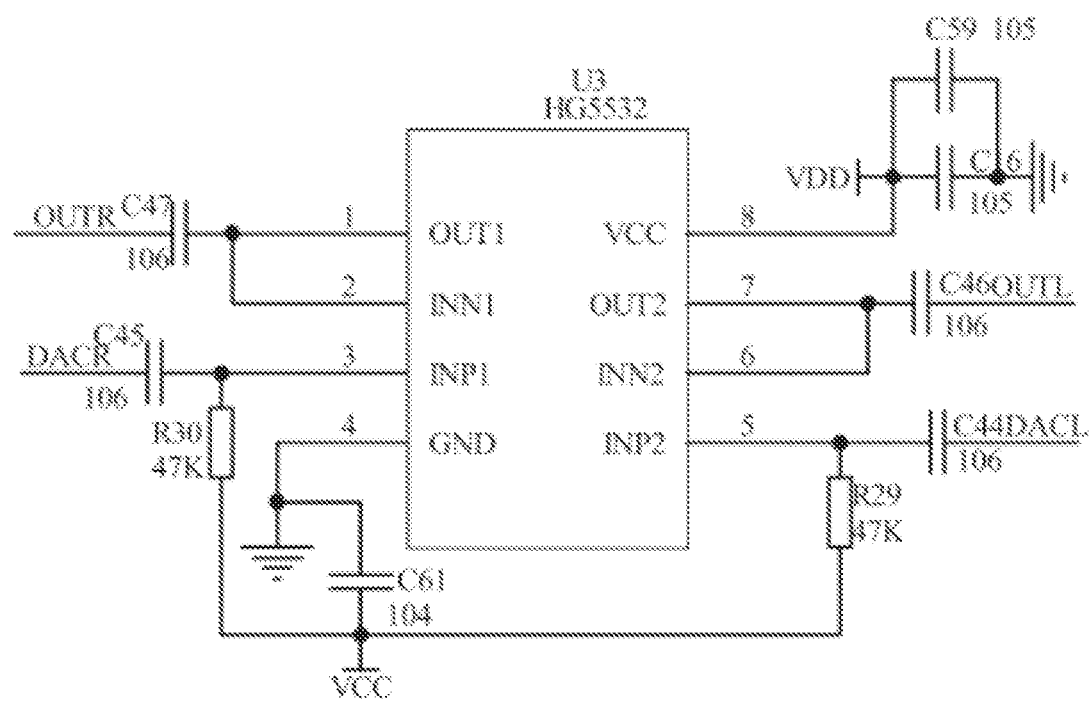
FIG. 2 is a circuit schematic diagram of one embodiment of a second processing submodule in the audio processing circuit.

Referring to FIG. 2, in one embodiment, the audio processing module 2 includes a second processing submodule.

The second processing submodule includes a second resistor R29, a third resistor R30, a first capacitor C59, a second capacitor C6, a third capacitor C61, a fourth capacitor C47, a fifth capacitor C45, a sixth capacitor C46, a seventh capacitor C44, and an operational amplifier U3.

A first end of the fourth capacitor C47 is electrically connected to the signal frequency division unit for inputting a signal of a first sound channel into the signal frequency division unit. A second end of the fourth capacitor C47 is electrically connected to a first pin of the operational amplifier U3 and a second pin of the operational amplifier U3.

Two ends of the fifth capacitor C45 are respectively electrically connected to a third pin of the operational amplifier U3 and an output end of the first sound channel of the wireless module, and a first end of the third resistor R30 is electrically connected to the third pin of the operational amplifier U3. A first end of the third capacitor C61 and a fourth pin of the operational amplifier U3 are grounded. A second end of the third resistor R30, a second end of the third capacitor C61, and a first end of the second resistor R29 are electrically connected to a fifth pin of the amplification and combination chip U5. A fifth pin of the operational amplifier U3 is electrically connected to a second end of the second resistor R29 and a first end of the seventh capacitor C44. A second end of the seventh capacitor C44 is electrically connected to an output end of a second sound channel of the wireless module. In one embodiment, the fifth pin of the amplification and combination chip U5 provides a power supply (that is, VCC).

A first end of the sixth capacitor C46 is electrically connected to the signal frequency division unit for inputting a signal of the second sound channel into the signal frequency division unit. A second end of the sixth capacitor C46 is electrically connected to a sixth pin of the operational amplifier U3 and a seventh pin of the operational amplifier U3.

An eighth pin of the operational amplifier U3 is electrically connected to the eighth pin of the amplification and combination chip U5, a first end of the first capacitor C59 and a first end of the second capacitor C6. A second end of the first capacitor C59 and a second end of the second capacitor C6 are grounded.

In present embodiment, a current amplification of the audio signal received by the wireless module is carried out by the second processing submodule, and then the audio signal is output to the signal frequency division unit for frequency division to realize a two-level processing of the second processing submodule and the first processing submodule. Compared with a first-level processing of the first processing submodule, an effect of the two-level processing on optimizing the audio signal at the front end of the FM transmitter module 3 is better.

Optionally, the first sound channel is a right sound channel, and the second sound channel is a left sound channel.

In one embodiment, a direct current of 5V output from the power supply is stepped down by a diode to supply power to the wireless master control chip. After the wireless master control chip works normally, the wireless master control chip outputs the audio signal from an output pin (the pin that outputs the audio signal of the first sound channel) of the first sound channel and an output pin (the pin that outputs the audio signal of the second sound channel) of the second sound channel. The audio signal output from the output pin of the first sound channel is coupled and filtered by the fifth capacitor C45 to eliminate redundant ripples in the audio signal. The audio signal output from the output pin of the second sound channel is coupled and filtered by the seventh capacitor C44 to eliminate redundant ripples in the audio signal. The operational amplifier U3 performs current amplification processing on the audio signal coupled and filtered by the fifth capacitor C45 and the seventh capacitor C44, and then outputs the audio signal of the first sound channel to the fourth capacitor C47 by the first pin of the operational amplifier U3, and performs coupling and filtering on the audio signal by the fourth capacitor C47 to eliminate redundant ripples in the audio signal, and outputs the audio signal of the first sound channel to the sixth capacitor C46 by the seventh pin of the operational amplifier U3, and perform coupling and filtering on the audio signal by the sixth capacitor C46 to eliminate redundant ripples in the audio signal. Compared with the audio signal received by the wireless module, the quality of the audio signal output by present embodiment is better.

It can be understood that, in present embodiment, the audio signal received by the wireless module directly is input in the second processing submodule, and the first processing submodule only receives the audio signal from the second processing submodule for processing, and the first processing submodule module no longer receives the audio signal from the wireless module.

Both the second resistor R29 and the third resistor R30 are resistors. The first capacitor C59, the second capacitor C6, the third capacitor C61, the fourth capacitor C47, the fifth capacitor C45, the sixth capacitor C46, and the seventh capacitor C44 are capacitors.

Figure 3:
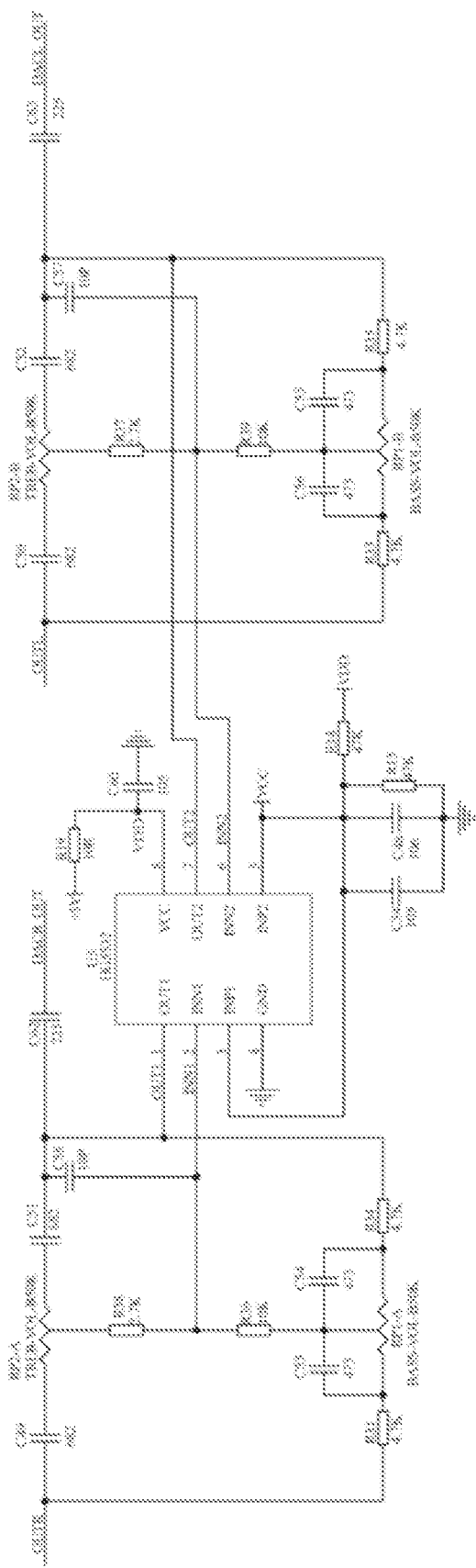
FIG. 3 is a circuit schematic diagram of one embodiment of a partial circuit of a first processing submodule in the audio processing circuit.
Figure 4:
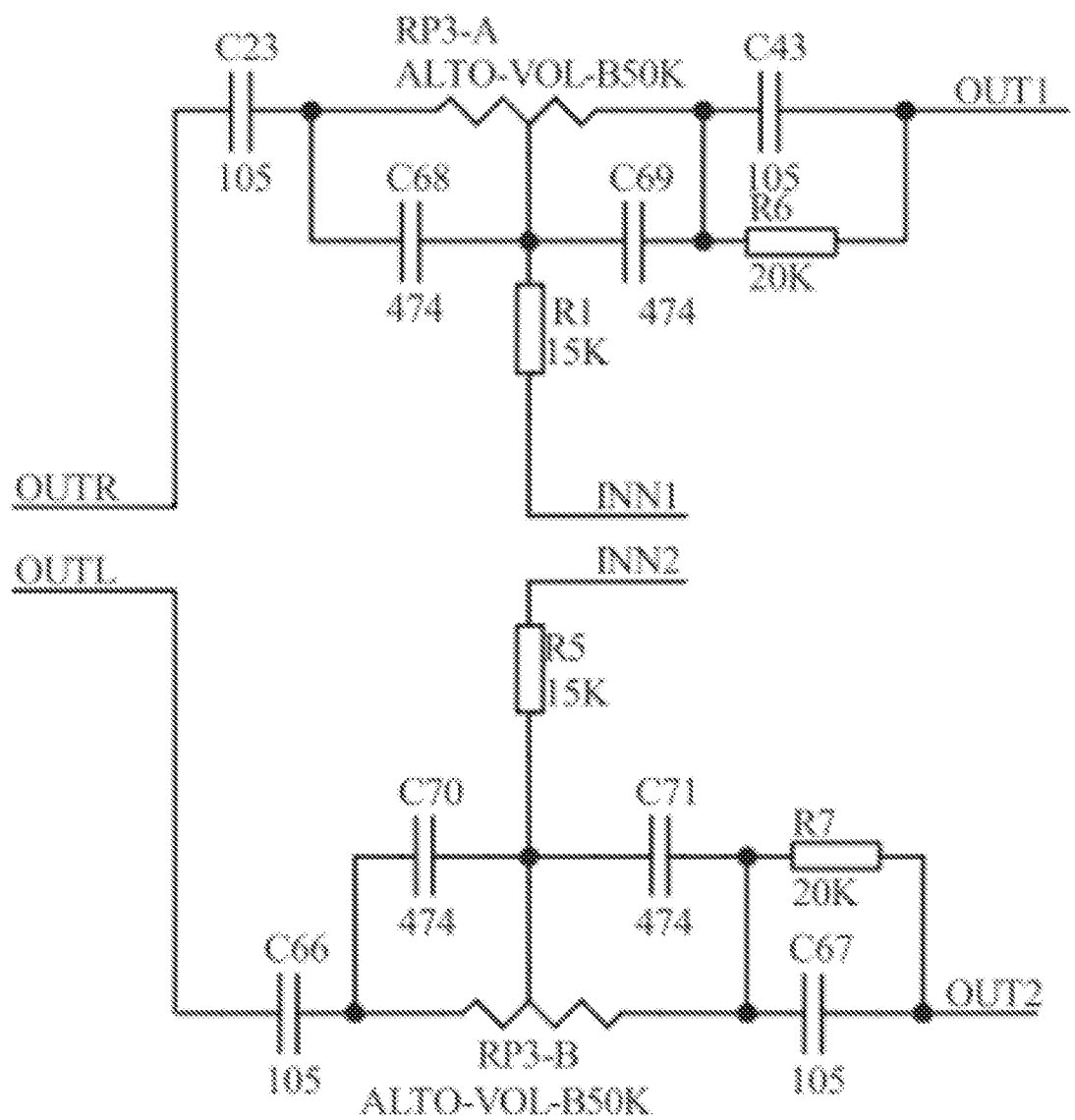
FIG. 4 is a circuit schematic diagram of another embodiment of the partial circuit of the first processing submodule in the audio processing circuit.
Figure 5:
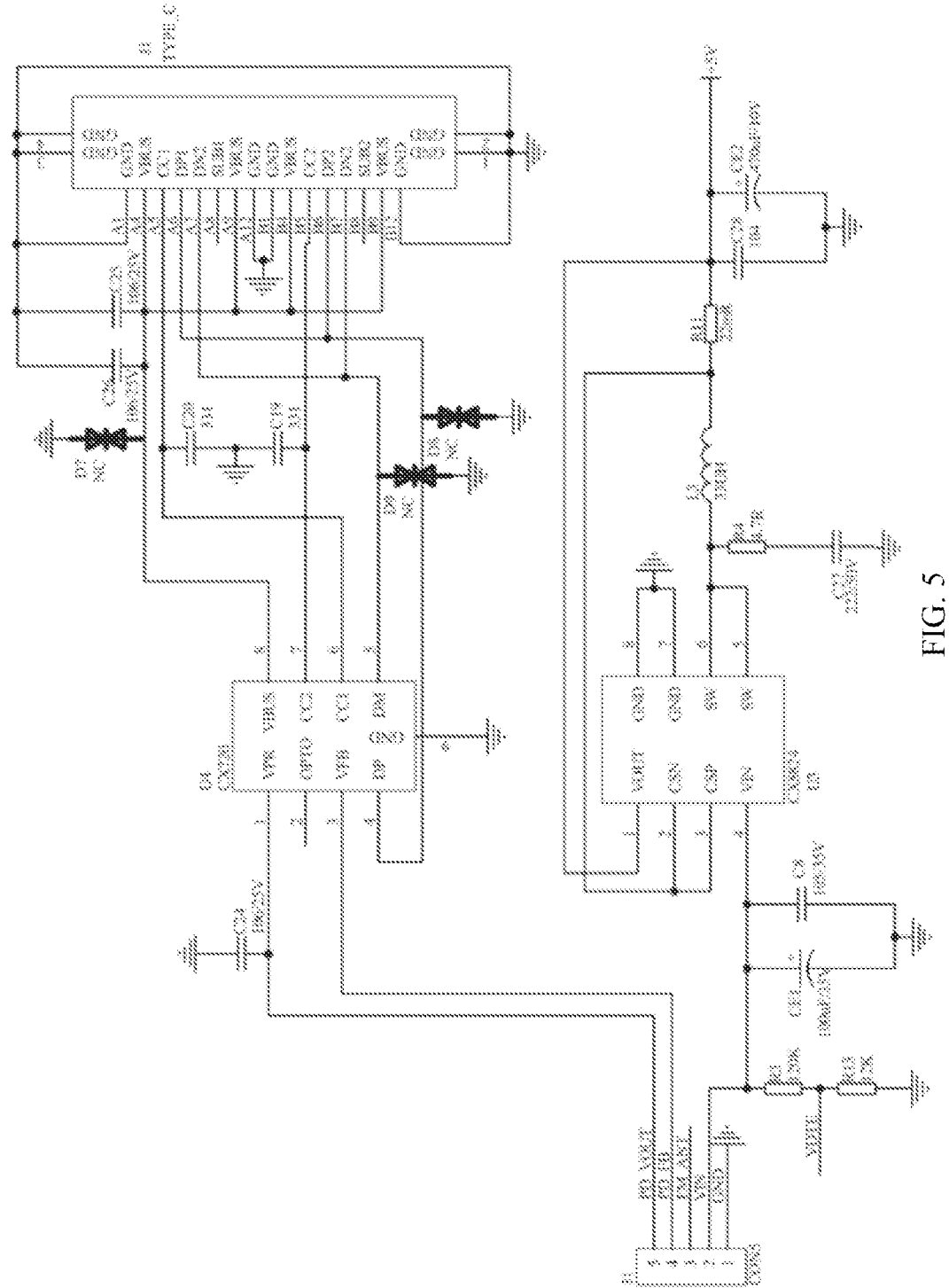
FIG. 5 is a circuit schematic diagram of one embodiment of a power supply module in the audio processing circuit.

Referring to FIG. 3 and FIG. 4, in one embodiment, the signal frequency division unit includes an eighth capacitor C49, a ninth capacitor C50, a tenth capacitor C23, an eleventh capacitor C66, a first frequency division resistor R31 and a second frequency division resistor R33.

In one embodiment, a first end of the eighth capacitor C49, a first end of the first frequency division resistor R31, and a first end of the tenth capacitor C23 are electrically connected to the output end of the first sound channel of the wireless module, so as to divide frequency of the first sound channel of the audio signal received by the wireless module. A second end of the eighth capacitor C49 is used as a first treble end, a second end of the first frequency division resistor R31 is used as a first bass end, and a second end of the tenth capacitor C23 is used as a first midrange end.

A first end of the ninth capacitor C50, a first end of the second frequency division resistor R33, and a first end of the eleventh capacitor C66 are electrically connected to the output end of the second sound channel of the wireless module, so as to divide frequency of the second sound channel of the audio signal received by the wireless module. A second end of the ninth capacitor C50 is used as a second treble end, a second end of the second frequency division resistor R33 is used as a second bass end, and a second end of the eleventh capacitor C66 is used as a second midrange end.

In one embodiment, both a capacity of the tenth capacitor C23 and a capacity of the eleventh capacitor C66 are higher than a capacity of the eighth capacitor C49, and both the capacity of the tenth capacitor C23 and the capacity of the eleventh capacitor C66 are higher than a capacity of the ninth capacitor C50.

In present embodiment, the frequency division is realized by the eighth capacitor C49, the ninth capacitor C50, the tenth capacitor C23, the eleventh capacitor C66, the first frequency division resistor R31 and the second frequency division resistor R33, so as to provide a basis for an independent frequency division adjustment of a treble, a midrange and a bass.

It can be understood that, in a solution of using the audio processing module 2, the first end of the eighth capacitor C49, the first end of the first frequency division resistor R31, and the first end of the tenth capacitor C23 are electrically connected to the operational amplifier U3 of the audio processing module 2. The first end of the eighth capacitor C49, the first end of the first frequency division resistor R31, the first end of the tenth capacitor C23 are no longer electrically connected to the output end of the first sound channel of the wireless module. The first end of the ninth capacitor C50, the first end of the second frequency division resistor R33, and the first end of the eleventh capacitor C66 are electrically connected to the output end of the second sound channel of the wireless module, which is used for frequency division of the second sound channel output by the operational amplifier U3 of the audio processing module 2. Frequency division of the second sound channel of the audio signal received by the wireless module no longer occurs.

Since the capacitor has an effect of passing high frequency single and blocking low frequency signal, thus, the high frequency signal is blocked by the first frequency division resistor R31 and the second frequency division resistor R33, and the high frequency signal will only pass through the eighth capacitor C49 and the ninth capacitor C50. The low frequency signal is blocked by the eighth capacitor C49 and the ninth capacitor C50, and will only pass through the first frequency division resistor R31 and the second frequency division resistor R33. After a signal of the input signal frequency division unit passing through the tenth capacitor C23 and the eleventh capacitor C66, the signal is performed frequency division again.

According to a capacitor frequency formula $F=1/(2\pi CXc)$, when a capacitive reactance is constant, the larger a capacitor capacity, the lower a passing frequency, that is, the capacitor capacity and the passing frequency show an inverse relationship. Since a capacity of the tenth capacitor C23 and a capacity of the eleventh capacitor C66 are higher than a capacity of the eighth capacitor C49, a capacity of the tenth capacitor C23 and a capacity of the eleventh capacitor C66 are higher than a capacity of the ninth capacitor C50$m$, therefore, a frequency of the signal flowing through the tenth capacitor C23 and the eleventh capacitor C66 will be lower than a frequency of the signal flowing through the eighth capacitor C49 and the ninth capacitor C50, and will be higher than a frequency of the signal flowing through the first frequency division resistor R31 and the second frequency division resistor R33. The frequency of the signal flowing through the tenth capacitor C23 and the eleventh capacitor C66 is a frequency between high frequency and low frequency, namely an intermediate frequency.

In one embodiment, the eighth capacitor C49, the ninth capacitor C50, the tenth capacitor C23, and the eleventh capacitor C66 are capacitors. The first frequency division resistor R31 and the second frequency division resistor R33 are resistors.

Referring to FIG. 3, in one embodiment, the treble adjustment subunit includes a first treble adjustable resistor RP2-A, a second treble adjustable resistor RP2-B, a twelfth capacitor C51, a thirteenth capacitor C52, a fourteenth capacitor C58 and a fifteenth capacitor C57.

A first end of the first treble adjustable resistor RP2-A is electrically connected to a first treble end of the signal frequency division unit. A second end of the first treble adjustable resistor RP2-A is electrically connected to a first end of the twelfth capacitor C51. An adjustable end of the first treble adjustable resistor RP2-A is electrically connected to a first input end of the amplification and combination chip U5. A first output end of the amplification and combination chip U5 is electrically connected to a first end of the fourteenth capacitor C58, a second end of the twelfth capacitor C51 and a first input end of the FM transmitter module 3. A second end of the fourteenth capacitor C58 is electrically connected to the first input end of the amplification and combination chip U5. In one embodiment, the first treble end outputs a signal of the first sound channel.

A first end of the second treble adjustable resistor RP2-B is electrically connected to a second treble end of the signal frequency division unit. A second end of the second treble adjustable resistor RP2-B is electrically connected to a first end of the thirteenth capacitor C52. An adjustable end of the second treble adjustable resistor RP2-B is electrically connected to a second input end of the amplification and combination chip U5. The second output end of the amplification and combination chip U5 is electrically connected to a first end of the fifteenth capacitor C57, a second end of the thirteenth capacitor C52, and a second input end of the FM transmitter module 3. A second end of the fifteenth capacitor C57 is electrically connected to the second input end of the amplification and combination chip U5. In one embodiment, the second treble end outputs a signal of the first sound channel.

The present embodiment independently adjusts the treble by the first treble adjustable resistor RP2-A and the second treble adjustable resistor RP2-B, which is conducive to improving the accuracy of adjustment, and is beneficial for the signal transmitting from the FM transmitter module 3 to the car-mounted radio to be more in line with user's individual needs, and further improving user experience.

In one embodiment, the twelfth capacitor C51, the thirteenth capacitor C52, the fourteenth capacitor C58, and the fifteenth capacitor C57 are capacitors.

In one embodiment, the first treble adjustable resistor RP2-A and the second treble adjustable resistor RP2-B are resistors with adjustable resistance.

Optionally, specifications of the first treble adjustable resistor RP2-A and the second treble adjustable resistor RP2-B are the same. Therefore, it is beneficial to realize same treble adjustment accuracy of the first sound channel and the second sound channel.

It can be understood that the specifications of the first treble adjustable resistor RP2-A and the second treble adjustable resistor RP2-B may also be different.

Optionally, the first treble adjustable resistor RP2-A and the second treble adjustable resistor RP2-B may be set as double potentiometers to realize synchronous adjustment of high frequency signals of all sound channels.

Optionally, the first treble adjustable resistor RP2-A and the second treble adjustable resistor RP2-B may be adjusted independently.

In another embodiment of the present disclosure, if the treble adjustment subunit is not defined, the first treble end of the signal frequency division unit is electrically connected to the first input end of the amplification and combination chip U5, and the second treble end of the signal frequency division unit is electrically connected to the second input end of the amplification and combination chip U5.

Referring to FIG. 3, in one embodiment, the treble adjustment subunit also includes a fourth resistor R38 and a fifth resistor R37.

A first end of the fourth resistor R38 is electrically connected to the adjustable end of the first treble adjustable resistor RP2-A, and a second end of the fourth resistor R38 is electrically connected to the first input end of the amplification and combination chip U5.

A first end of the fifth resistor R37 is electrically connected to the adjustable end of the second treble adjustable resistor RP2-B, and a second end of the fifth resistor R37 is electrically connected to the second input end of the amplification and combination chip U5.

In present embodiment, by a cooperation of the fourth resistor R38 and the first treble adjustable resistor RP2-A, and a cooperation of the fifth resistor R37 and the second treble adjustable resistor RP2-B, the accuracy of the magnification adjustment is improved, and the accuracy of the adjustment is further improved.

In one embodiment, both the fourth resistor R38 and the fifth resistor R37 are resistors.

The amplification and combination chip U5 has a function of signal amplification. According to a principle formula of an operational amplifier, an amplification factor of the amplification and combination chip U5 is calculated according to a formula $S=1+R_f/R_i$, where, S is the amplification factor, Rf is a feedback resistance, Ri is an input resistance. In one embodiment, a feedback resistance of a treble signal loop of the second sound channel is the second treble adjustable resistor RP2-B, and an input resistance is a sum of the second treble adjustable resistor RP2-B and the fifth resistor R37. In one embodiment, a feedback resistance of a treble signal loop of the first sound channel is the first treble adjustable resistor RP2-A, and an input resistance is a sum of the first treble adjustable resistance RP2-A and the fourth resistance R38. When the first treble adjustable resistor RP2-A is manually adjusted, the amplification factor of the audio signal of the first output end of the amplification and combination chip U5 will be adjusted accordingly, and a treble of the first sound channel will change accordingly. When the second treble adjustable resistor RP2-B is manually adjusted, the amplification factor of the audio signal of the second output end of the amplification and combination chip U5 will be adjusted accordingly, and a treble of the second channel will change accordingly.

It can be understood that both the fourth resistor R38 and the fifth resistor R37 are resistors that balance a relationship between an input and an output. In one embodiment, a packaging function of the fourth resistor R38 and the fifth resistor R37 is integrated in the amplification and combination chip U5, and there is no need to separately set the fourth resistor R38 and the fifth resistor R37. In one embodiment, an adjustable end of the first treble adjustable resistor RP2-A is electrically connected to a first input end of the amplification and combination chip U5, and an adjustable end of the second treble adjustable resistor RP2-B is electrically connected to a second input end of the amplification and combination chip U5.

Referring to FIG. 3, in one embodiment, the bass adjustment subunit includes a sixteenth capacitor C53, a seventeenth capacitor C54, an eighteenth capacitor C56, a nineteenth capacitor C55, a first bass adjustable resistor RP1-A and a second bass adjustable resistor RP1-B.

The first input end of the amplification and combination chip U5 is electrically connected to an adjustable end of the first bass adjustable resistor RP1-A, a first end of the sixteenth capacitor C53 and a first end of the seventeenth capacitor C54. A first bass end of the signal frequency division unit is electrically connected to a second end of the sixteenth capacitor C53 and a first end of the first bass adjustable resistor RP1-A. A first output end of the amplification and combination chip U5 is electrically connected to a second end of the seventeenth capacitor C54 and a second end of the first bass adjustable resistor RP1-A, and the first bass end outputs a signal of the first sound channel.

The second input end of the amplification and combination chip U5 is electrically connected to an adjustable end of the second bass adjustable resistor RP1-B, a first end of the eighteenth capacitor C56 and a first end of the nineteenth capacitor C55. A second bass end of the signal frequency division unit is electrically connected to a second end of the eighteenth capacitor C56 and a first end of the second bass adjustable resistor RP1-B. A second output end of the amplification and combination chip U5 is electrically connected to a second end of the nineteenth capacitor C55 and a second end of the second bass adjustable resistor RP1-B, and the second bass end outputs a signal of the second sound channel.

The present embodiment realizes an independent adjustment of a bass by the first bass adjustable resistor RP1-A and the second bass adjustable resistor RP1-B, which is conducive to improving the accuracy of adjustment, and is beneficial for the signal transmitting from the FM transmitter module 3 to the car-mounted radio to be more in line with user's individual needs, and further improving user experience.

In one embodiment, the sixteenth capacitor C53, the seventeenth capacitor C54, the eighteenth capacitor C56, and the nineteenth capacitor C55 are capacitors.

In one embodiment, the first bass adjustable resistor RP1-A and the second bass adjustable resistor RP1-B are resistors with adjustable resistance.

Optionally, specifications of the first bass adjustable resistor RP1-A and the second bass adjustable resistor RP1-B are the same, which is conducive to achieving a same bass adjustment accuracy for the first sound channel and the second sound channel.

It can be understood that the specifications of the first bass adjustable resistor RP1-A and the second bass adjustable resistor RP1-B may also be different.

Optionally, the first bass adjustable resistor RP1-A and the second bass adjustable resistor RP1-B are set as double potentiometers, which are used to realize synchronous adjustment of low frequency signals of all sound channels.

Optionally, the first bass adjustable resistor RP1-A and the second bass adjustable resistor RP1-B may be adjusted independently.

In one embodiment, if the bass adjustment subunit is not defined, then the first bass end of the signal frequency division unit is electrically connected to the first input end of the amplification and combination chip U5, and the second treble end of the signal frequency division unit is electrically connected to the second input end of the amplifying and combination chip U5.

Referring to FIG. 3, in one embodiment, the bass adjustment subunit further includes a sixth resistor R34, a seventh resistor R36, an eighth resistor R35 and a ninth resistor R39.

The first end of the seventh resistor R36 is electrically connected to the first input end of the amplification and combination chip U5. A second end of the seventh resistor R36 is electrically connected to the adjustable end of the first bass adjustable resistor RP1-A, the first end of the sixteenth capacitor C53, and the first end of the seventeenth capacitor C54. A first end of the sixth resistor R34 is electrically connected to the first output end of the amplification and combination chip U5. A second end of the sixth resistor R34 is electrically connected to the second end of the seventeenth capacitor C54 and the second end of the first bass adjustable resistor RP1-A.

A first end of the ninth resistor R39 is electrically connected to the second input end of the amplification and combination chip U5. A second end of the ninth resistor R39 is electrically connected to the adjustable end of the second bass adjustable resistor RP1-B, the first end of the eighteenth capacitor C56, and the first end of the nineteenth capacitor C55. A first end of the eighth resistor R35 is electrically connected to the second output end of the amplification and combination chip U5. A second end of the eighth resistor R35 is electrically connected to the second end of the nineteenth capacitor C55 and the second end of the second bass adjustable resistor RP1-B.

In present embodiment, by a cooperation between the first bass adjustable resistor RP1-A, the sixth resistor R34, and the seventh resistor R36, and a cooperation between the second bass adjustable resistor RP1-B, the eighth resistor R35, and the ninth resistor R39, the accuracy of magnification adjustment is improved, and the accuracy of adjustment is further improved. In one embodiment, the sixth resistor R34, the seventh resistor R36, the eighth resistor R35 and the ninth resistor R39 are resistors.

The amplification and combination chip U5 has the function of signal amplification. According to the principle formula of the operational amplifier, the amplification factor of the amplification and combination chip U5 is equal to $(1+R_f/R_i)$, where, Rf is a feedback resistance, Ri is an input resistance. In one embodiment, a feedback resistance of a bass signal loop of the second sound channel is a sum of the second bass adjustable resistor RP1-B and the eighth resistor R35, and an input resistance is a sum of the second bass adjustable resistor RP1-B, the ninth resistor R39 and the second frequency division resistor R33. In one embodiment, a feedback resistance of a bass signal loop of the first sound channel is a sum of the first bass adjustable resistor RP1-A and the sixth resistor R34, and the input resistance is a sum of the first bass adjustable resistor RP1-A, the seventh resistor R36 and the first frequency division resistor R31. When the first bass adjustable resistor RP1-A is manually adjusted, the amplification factor of the audio signal of the first output end of the amplification and combination chip U5 will be adjusted accordingly, and a bass of the first sound channel will change accordingly. When the second bass adjustable resistor RP1-B is manually adjusted, the amplification factor of the audio signal of the second output end of the amplification and combination chip U5 will be adjusted accordingly, and a bass of the second channel will change accordingly.

Referring to FIG. 4, in one embodiment, the midrange adjustment subunit includes a twentieth capacitor C70, a twenty-first capacitor C71, a twenty-second capacitor C67, a twenty-third capacitor C68, a twenty-fourth capacitor C69, a twenty-fifth capacitor C43, a first midrange adjustable resistor RP3-A and a second midrange adjustable resistor RP3-B.

A first midrange end of the signal frequency division unit is electrically connected to a first end of the twenty-third capacitor C68 and a first end of the first midrange adjustable resistor RP3-A. The first input end of the amplification and combination chip U5 is electrically connected to a second end of the twenty-third capacitor C68, a first end of the twenty-fourth capacitor C69, and an adjustable end of the first midrange adjustable resistor RP3-A. A first end of the twenty-fifth capacitor C43 is electrically connected to a second end of the twenty-fourth capacitor C69 and a second end of the first midrange adjustable resistor RP3-A. A second end of the twenty-fifth capacitor C43 is electrically connected to the first output end of the amplification and combination chip U5.

A second midrange end of the signal frequency division unit is electrically connected to a first end of the twentieth capacitor C70 and a first end of the second midrange adjustable resistor RP3-B. The second input end of the amplification and combination chip U5 is electrically connected to a second end of the twentieth capacitor C70, a first end of the twenty-first capacitor C71, and an adjustable end of the second midrange adjustable resistor RP3-B. A first end of the twenty-second capacitor C67 is electrically connected to a second end of the twenty-first capacitor C71 and a second end of the second midrange adjustable resistor RP3-B. A second end of the twenty-second capacitor C67 is electrically connected to the second output end of the amplification and combination chip U5.

In present embodiment, a midrange is individually adjustable by the first midrange adjustable resistor RP3-A and the second midrange adjustable resistor RP3-B, which is conducive to improving an accuracy of adjustment, and is beneficial for the signal transmitting from the FM transmitter module 3 to the car-mounted radio to be more in line with user's individual needs, and further improving user experience.

In one embodiment, the twentieth capacitor C70, the twenty-first capacitor C71, the twenty-second capacitor C67, the twenty-third capacitor C68, the twenty-fourth capacitor C69, and the twenty-fifth capacitor C43 are capacitors.

In one embodiment, the first midrange adjustable resistor RP3-A and the second midrange adjustable resistor RP3-B are resistors with adjustable resistance.

Optionally, specifications of the first midrange adjustable resistor RP3-A and the second midrange adjustable resistor RP3-B are the same, which is conducive to achieving the same midrange adjustment accuracy of the first sound channel and the second sound channel.

It can be understood that the specifications of the first midrange adjustable resistor RP3-A and the second midrange adjustable resistor RP3-B may also be different.

Optionally, the first midrange adjustable resistor RP3-A and the second midrange adjustable resistor RP3-B are set as double potentiometers for synchronous adjustment of the intermediate frequency signals of all sound channels.

Optionally, the first midrange adjustable resistor RP3-A and the second midrange adjustable resistor RP3-B may be adjusted independently.

In another embodiment of the present disclosure, if the midrange adjustment subunit is not defined, then a first midrange end of the signal frequency division unit is electrically connected to the first input end of the amplification and combination chip U5, and a second midrange end of the signal frequency division unit is electrically connected to the second input end of the amplification and combination chip U5.

Referring to FIG. 4, in one embodiment, the midrange adjustment subunit further includes a tenth resistor R1 and an eleventh resistor R5.

In one embodiment, a first end of the tenth resistor R1 is electrically connected to the first input end of the amplification and combination chip U5. A second end of the tenth resistor R1 is electrically connected to the second end of the twenty-third capacitor C68, the first end of the twenty-fourth capacitor C69, and the adjustable end of the first midrange adjustable resistor RP3-A.

In one embodiment, a first end of the eleventh resistor R5 is electrically connected to the second input end of the amplification and combination chip U5. A second end of the eleventh resistor R5 is electrically connected to the second end of the twentieth capacitor C70, the first end of the twenty-first capacitor C71, and the adjustable end of the second midrange adjustable resistor RP3-B.

In present embodiment, by a cooperation between the first midrange adjustable resistor RP3-A and the tenth resistor R1, and a cooperation between the second midrange adjustable resistor RP3-B and the eleventh resistor R5, the accuracy of the magnification adjustment and the accuracy of adjustment are improved.

In one embodiment, the tenth resistor R1 and the eleventh resistor R5 are resistors.

Referring to FIG. 4, in one embodiment, the midrange adjustment subunit further includes a twelfth resistor R6 and a thirteenth resistor R7.

Two ends of the twelfth resistor R6 are respectively electrically connected to the second end of the twenty-fourth capacitor C69 and the first output end of the amplification and combination chip U5.

Two ends of the thirteenth resistor R7 are respectively electrically connected to the second end of the twenty-first capacitor C71 and the second output end of the amplification and combination chip U5.

In present disclosure, by a cooperation between the first midrange adjustable resistor RP3-A and the twelfth resistor R6, and a cooperation between the second midrange adjustable resistor RP3-B and the thirteenth resistor R7, the accuracy of the magnification adjustment and the accuracy of adjustment are improved.

In one embodiment, the twelfth resistor R6 and the thirteenth resistor R7 are resistors.

The amplification and combination chip U5 has the function of signal amplification. According to the principle formula of the operational amplifier, the amplification factor of the amplification and combination chip U5 is equal to $(1+R_f/R_i)$, where, Rf is a feedback resistance, Ri is an input resistance. In one embodiment, a feedback resistance of a midrange signal loop of the second sound channel is a sum of the second midrange adjustable resistor RP3-B and the twelfth resistor R6, and an input resistance is a sum of the second midrange adjustable resistor RP3-B and the tenth resistor R1. In one embodiment, a feedback resistance of a midrange signal loop of the first sound channel is a sum of the first midrange adjustable resistor RP3-A and the thirteenth resistor R7, and the input resistance is a sum of the first midrange adjustable resistor RP3-A and the eleventh resistor R5, the seventh resistor R36 and the first frequency division resistor R31. When the first midrange adjustable resistor RP3-A is manually adjusted, the amplification factor of the audio signal of the first output end of the amplification and combination chip U5 will be adjusted accordingly, and a midrange of the first sound channel will change accordingly. When the second midrange adjustable resistor RP3-B is manually adjusted, the amplification factor of the audio signal of the second output end of the amplification and combination chip U5 will be adjusted accordingly, and a midrange of the second channel will change accordingly.

In one embodiment, the treble adjustment subunit synchronously adjusts the high frequency signals of all sound channels, and the bass adjustment subunit synchronously adjusts the low frequency signals of all sound channels, and the midrange adjustment subunit synchronously adjusts the intermediate frequency signals of all sound channels.

In present embodiment, the high frequency signals of all sound channels are adjusted synchronously by the treble adjustment subunit, the low frequency signals of all sound channels are adjusted synchronously by the bass adjustment subunit, and the intermediate frequency signals of all sound channels are adjusted synchronously by the midrange adjustment subunit, therefore synchronously adjusting all sound channels in the case of independent adjustments of the treble, the midrange and the bass, simplifying adjustment operations, meeting individual needs, and maintaining a consistency of all sound channels.

Referring to FIG. 3, in one embodiment, the first processing submodule further includes a twenty-sixth capacitor C62 and a twenty-seventh capacitor C63.

In one embodiment, a first end of the twenty-sixth capacitor C62 is electrically connected to the first output end of the amplification and combination chip U5. A second end of the twenty-sixth capacitor C62 is electrically connected to the first input end of the FM transmitter module 3.

In one embodiment, a first end of the twenty-seventh capacitor C63 is electrically connected to the second output end of the amplification and combination chip U5. A second end of the twenty-seventh capacitor C63 is electrically connected to the second input end of the FM transmitter module 3.

In present disclosure, the signal output by the first output end of the amplification and combination chip U5 is filtered by the twenty-sixth capacitor C62, and the signal output by the second output end of the amplification and combination chip U5 is filtered by the twenty-seventh capacitor C63, improving a quality of the signal input to the FM transmitter module 3.

In one embodiment, the twenty-sixth capacitor C62 and the twenty-seventh capacitor C63 are capacitors.

In one embodiment, the audio processing module 2 is a DSP chip.

Specifically, the first processing submodule is replaced by the DSP chip. The DSP chip is a digital signal processor.

Figure 7:
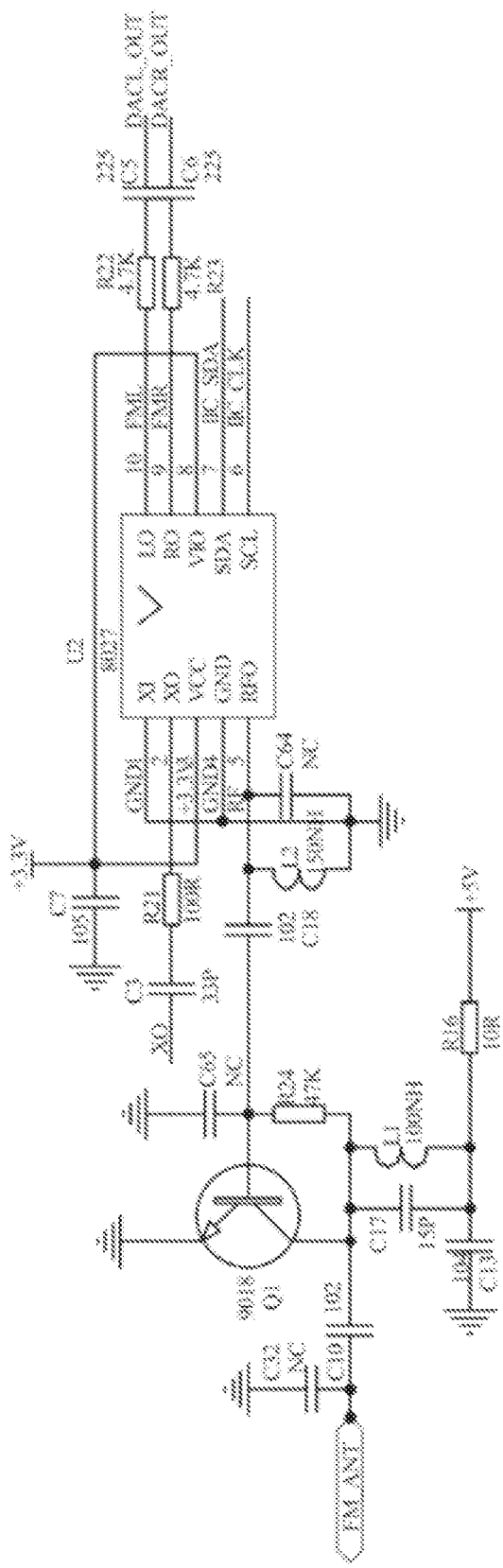
FIG. 7 is a circuit schematic diagram of one embodiment of a FM transmitter module in the audio processing circuit.

Referring to FIG. 7, in one embodiment, the FM transmitter module 3 includes a FM transmitter submodule, a twenty-eighth capacitor C5, a twenty-ninth capacitor C6, a fourteenth resistor R22, and a fifteenth resistor R23.

A first end of the twenty-ninth capacitor C6 is electrically connected to a first output end of the audio processing module 2 for receiving the signal of the first sound channel. A second end of the twenty-ninth capacitor C6 is electrically connected to a first end of the fifteenth resistor R23. A second end of the fifteenth resistor R23 is electrically connected to a first input end of the FM transmitter submodule.

In one embodiment, a first end of the twenty-eighth capacitor C5 is electrically connected to a second output end of the audio processing module 2 for receiving the signal of the second sound channel. A second end of the twenty-eighth capacitor C5 is electrically connected to a first end of the fourteenth resistor R22. A second end of the fourteenth resistor R22 is electrically connected to a second input end of the FM transmitter submodule.

In present embodiment, the signal of the second sound channel input by the audio processing module 2 is filtered to eliminate ripple by the twenty-eighth capacitor C5 and the fourteenth resistor R22, and the signal of the first sound channel input by the audio processing module 2 is filtered by the twenty-ninth capacitor C6 and the fifteenth resistor R23 to eliminate ripples, further improving the quality of the signal used for FM and the sound quality of the audio played by the car-mounted radio.

In one embodiment, the FM transmitter submodule includes a FM transmitter chip and a supporting circuit of the FM transmitter chip.

In one embodiment, the twenty-eighth capacitor C5 and the twenty-ninth capacitor C6 are capacitors.

In one embodiment, the fourteenth resistor R22 and the fifteenth resistor R23 are resistors.

In FIG. 7, U2 is the FM transmitter chip, and FM ANT is the transmitting antenna, and C10, C32, C17, C12, C13, C65, C18, C64, C3, C7 are capacitors, and L1, L2 are inductors, and Q1 is NPN transistor, and R16, R24, R21 are resistors, +5V end is connected to the power supply module 4. It can be understood that the FM transmitter submodule can also be an existed FM module, which is not limited here.

Figure 8:
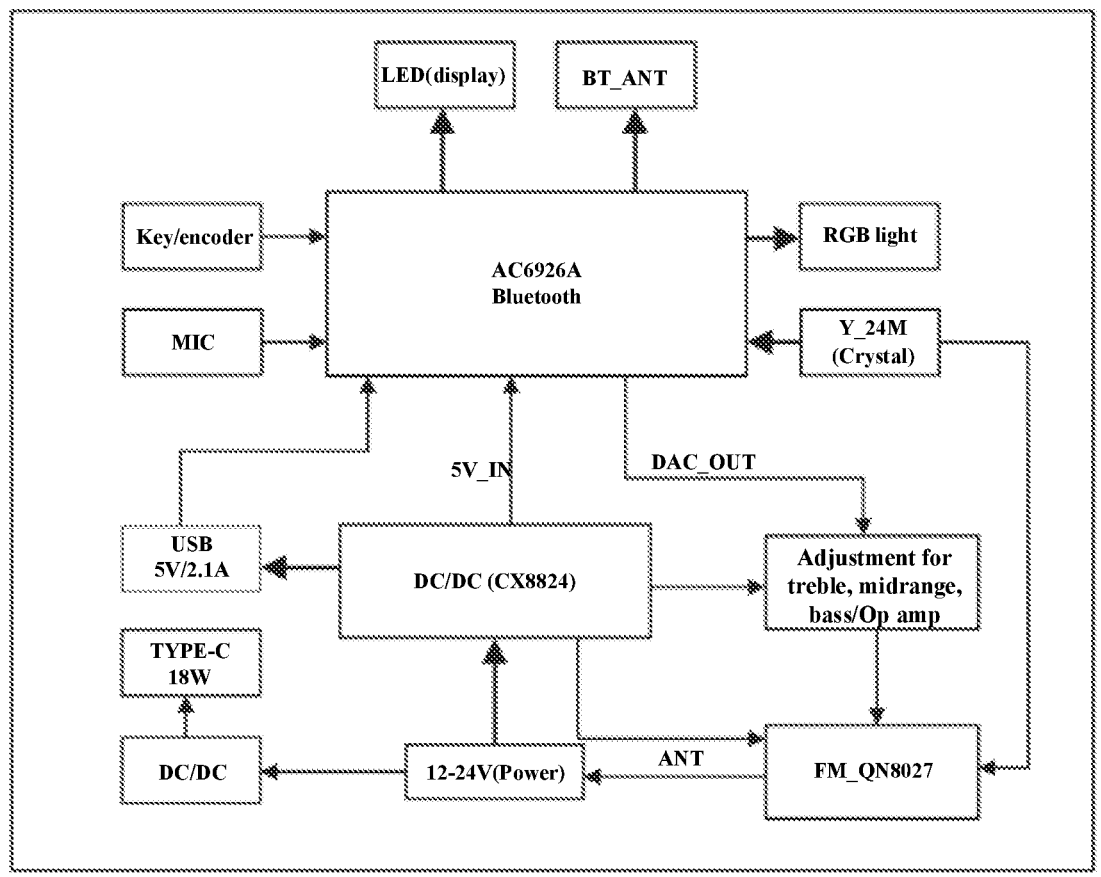
FIG. 8 is a block diagram of one embodiment of a car-mounted player in the audio processing circuit.

Referring to FIG. 8, in one embodiment, the present disclosure provides a car-mounted player. The car-mounted player includes an audio processing circuit.

The audio processing circuit includes a signal acquisition module 1, an audio processing module 2, a FM transmitter module 3, and a power supply module 4.

The signal acquisition module 1 is a wireless input module and/or a wired input module. The wireless input module receives an audio signal based on a wireless technology, and the wired input module is configured to receive the audio signal based on a wired technology.

The audio processing module 2 is configured to process the audio signal received by the signal acquisition module 1 to improve sound quality of the audio signal.

The FM transmitter module 3 is configured to perform FM transmission on the audio signal output by the audio processing module 2.

The power supply module 4 is configured to supply power to the signal acquisition module 1, the audio processing module 2 and the FM transmitter module 3.

The present embodiment realizes an optimization of the audio signal by the audio processing module 2 before the audio signal is input the FM transmitter module 3, therefore improving a quality of the audio signal received by the car-mounted player (for example, car-mounted radio), greatly improving a sound quality of the audio played by the car-mounted player, and user experience.

FIG. 8 illustrates a box diagram of the car-mounted player, a light emitting diode (LED) display is set on the car-mounted player to display information. A BT-ANT is a wireless antenna. A RGB light are an indicator of adjustment degree. A AC6926A is the wireless master chip of. A Y_24M is a crystal. Adjustment for treble, midrange, bass/Op amp is the audio processing module 2. A FM_QN8027 is a FM transmitter chip. A DC/DC is the power supply module 4. A Type-C is an interface, and a USB is an interface of a general serial bus. A 12-24V (Power) is an external power interface. A MIC is a microphone. A key/encoder is a button and an encoder.

In one embodiment, the present disclosure further provides a wireless playback system. The wireless playback system includes an audio processing circuit.

The audio processing circuit includes a signal acquisition module 1, an audio processing module 2, a FM transmitter module 3, and a power supply module 4.

The signal acquisition module 1 is a wireless input module and/or a wired input module. The wireless input module receives an audio signal based on a wireless technology, and the wired input module is configured to receive the audio signal based on a wired technology.

The audio processing module 2 is configured to process the audio signal received by the signal acquisition module 1 to improve sound quality of the audio signal.

The FM transmitter module 3 is configured to perform FM transmission on the audio signal output by the audio processing module 2.

The power supply module 4 is configured to supply power to the signal acquisition module 1, the audio processing module 2 and the FM transmitter module 3.

The present embodiment realizes an optimization of the audio signal by the audio processing module 2 before the audio signal is input the FM transmitter module 3, therefore improving a quality of the audio signal received by a car-mounted radio, greatly improving a sound quality of the audio played by the car-mounted radio, and user experience.

In one embodiment, the wireless playback system further includes a mobile device and a car-mounted radio. The mobile device sends the audio signal to the wireless module based on wireless. The car-mounted radio receives the audio signal sent by the FM transmitter module 3.

In one embodiment, the present disclosure further provides a transportation device. The transportation device includes an audio processing circuit. The audio processing circuit includes a signal acquisition module 1, an audio processing module 2, a FM transmitter module 3, and a power supply module 4.

The signal acquisition module 1 is a wireless input module and/or a wired input module. The wireless input module receives an audio signal based on a wireless technology, and the wired input module is configured to receive the audio signal based on a wired technology.

The audio processing module 2 is configured to process the audio signal received by the signal acquisition module 1 to improve sound quality of the audio signal.

The FM transmitter module 3 is configured to perform FM transmission on the audio signal output by the audio processing module 2.

The power supply module 4 is configured to supply power to the signal acquisition module 1, the audio processing module 2 and the FM transmitter module 3.

The present embodiment realizes an optimization of the audio signal by the audio processing module 2 before the audio signal is input the FM transmitter module 3, therefore improving a quality of the audio signal received by a car-mounted radio, greatly improving a sound quality of the audio played by the car-mounted radio, and user experience.

In one embodiment, the transportation device includes, but is not limited to a car and a bus car.

The technical characteristics of the above embodiments can be arbitrarily combined. In order to make the description of the preset disclosure concise, all possible combinations of the technical characteristics in the above embodiments are not described. However, as long as the combination of the technical characteristics does not have contradictions, it should be considered as the scope of the present disclosure.

The examples described above only expressed several embodiments of the present disclosure. The description of the embodiments of the present disclosure is more specific and detailed, but it cannot be understood as a limit on the scope of the present disclosure. It should be noted that for ordinary technical personnel in the art, under a premise of not being separated from the present disclosure, several deformation and improvement can be made, which belong to the scope of protection of the present disclosure. Therefore, the scope of protection of the present disclosure should be based on appended claims.

What is claimed is:

1. An audio processing circuit comprising:
a signal acquisition module comprising a wireless input module and/or a wired input module, wherein the wireless input module is configured to receive an audio signal based on a wireless technology, and the wired input module is configured to receive the audio signal based on a wired technology;
an audio processing module, configured to process the audio signal received by the signal acquisition module to improve sound quality of the audio signal;
a frequency modulation (FM) transmitter module, configured to perform FM transmission on the audio signal output by the audio processing module;
a power supply module, configured to supply power to the signal acquisition module, the audio processing module and the FM transmitter module;
wherein the wireless input module includes a wireless module, and the wireless module is configured to receive the audio signal based on a wireless technology;
the audio processing module comprises a first processing submodule;
the first processing submodule comprises a signal frequency division unit, a frequency division adjustment unit, and an amplification and combination unit;
the signal frequency division unit is electrically connected to the power supply module and the wireless module, and the signal frequency division unit is configured to perform frequency division of the audio signal received by the wireless module;
the frequency division adjustment unit comprises at least one of a treble adjustment subunit, a bass adjustment subunit, and a midrange adjustment subunit; the treble adjustment subunit is configured to adjust a high frequency signal obtained by a frequency division of the signal frequency division unit, and the bass adjustment subunit is configured to adjust a low frequency signal obtained by the frequency division of the signal frequency division unit, and the midrange adjustment subunit is configured to adjust an intermediate frequency signal obtained by the frequency division of the signal frequency division unit;
the amplification and combination unit comprises an amplification and combination chip and a voltage division subunit, the amplification and combination chip is electrically connected to the frequency division adjustment unit, the FM transmitter module, and the power supply module; the amplification and combination chip is configured to amplify and combine signals output by the frequency division adjustment unit, and output the signals to the FM transmitter module;
the voltage division subunit comprises a first resistor, an eighth pin of the amplification and combination chip is electrically connected to a first end of the first resistor, and a second end of the first resistor is electrically connected to the power supply module, the eighth pin of the amplification and combination chip is configured to provide a reference power supply.

2. The audio processing circuit as recited in claim 1, wherein the audio processing module comprises a second processing submodule;

the second processing submodule comprises a second resistor, a third resistor, a first capacitor, a second capacitor, a third capacitor, a fourth capacitor, a fifth capacitor, a sixth capacitor, a seventh capacitor, and an operational amplifier;

a first end of the fourth capacitor is electrically connected to the signal frequency division unit, and the first end of the fourth capacitor inputs a signal of a first sound channel of the wireless module into the signal frequency division unit, and a second end of the fourth capacitor is electrically connected to a first pin of the operational amplifier and a second pin of the operational amplifier;

two ends of the fifth capacitor are respectively electrically connected to a third pin of the operational amplifier and an output end of the first sound channel of the wireless module; a first end of the third resistor is electrically connected to the third pin of the operational amplifier; a first end of the third capacitor and a fourth pin of the operational amplifier are grounded; a second end of the third resistor, a second end of the third capacitor, and a first end of the second resistor are electrically connected to a fifth pin of the amplification and combination chip; a fifth pin of the operational amplifier is electrically connected to a second end of the second resistor and a first end of the seventh capacitor, a second end of the seventh capacitor is electrically connected to an output end of a second sound channel of the wireless module, and the fifth pin of the amplification and combination chip provides a power supply;

a first end of the sixth capacitor is electrically connected to the signal frequency division unit for inputting a signal of the second sound channel of the wireless module into the signal frequency division unit; a second end of the sixth capacitor is electrically connected to a sixth pin of the operational amplifier and a seventh pin of the operational amplifier;

an eighth pin of the operational amplifier is electrically connected to the eighth pin of the amplification and combination chip, a first end of the first capacitor and a first end of the second capacitor; a second end of the first capacitor and a second end of the second capacitor are grounded.

3. The audio processing circuit as recited in claim 1, wherein the signal frequency division unit includes an eighth capacitor, a ninth capacitor, a tenth capacitor, an eleventh capacitor, a first frequency division resistor and a second frequency division resistor;

a first end of the eighth capacitor, a first end of the first frequency division resistor, and a first end of the tenth capacitor are electrically connected to an output end of a first sound channel of the wireless module for dividing frequency of the first sound channel of the audio signal received by the wireless module; a second end of the eighth capacitor is used as a first treble end, a second end of the first frequency division resistor is used as a first bass end, and a second end of the tenth capacitor is used as a first midrange end;

a first end of the ninth capacitor, a first end of the second frequency division resistor, and a first end of the eleventh capacitor are electrically connected to an output end of a second sound channel of the wireless module for dividing frequency of the second sound channel of the audio signal received by the wireless module; a second end of the ninth capacitor is used as a second treble end, a second end of the second frequency division resistor is used as a second bass end, and a second end of the eleventh capacitor is used as a second midrange end;

both a capacity of the tenth capacitor and a capacity of the eleventh capacitor are higher than a capacity of the eighth capacitor, and both the capacity of the tenth capacitor and the capacity of the eleventh capacitor are higher than a capacity of the ninth capacitor.

4. The audio processing circuit as recited in claim 1, wherein the treble adjustment subunit comprises a first treble adjustable resistor, a second treble adjustable resistor, a twelfth capacitor, a thirteenth capacitor, a fourteenth capacitor, and a fifteenth capacitor;

a first end of the first treble adjustable resistor is electrically connected to a first treble end of the signal frequency division unit, and a second end of the first treble adjustable resistor is electrically connected to a first end of the twelfth capacitor; an adjustable end of the first treble adjustable resistor is electrically connected to a first input end of the amplification and combination chip, and a first output end of the amplification and combination chip is electrically connected to a first end of the fourteenth capacitor, a second end of the twelfth capacitor and a first input end of the FM transmitting module; a second end of the fourteenth capacitor is electrically connected to the first input end of the amplification and combination chip, and the first treble end outputs a signal of a first sound channel of the wireless module;

a first end of the second treble adjustable resistor is electrically connected to a second treble end of the signal frequency division unit, and a second end of the second treble adjustable resistor is electrically connected to a first end of the thirteenth capacitor;

an adjustable end of the second treble adjustable resistor is electrically connected to a second input end of the amplification and combination chip, and the second output end of the amplification and combination chip is electrically connected to a first end of the fifteenth capacitor, a second end of the thirteenth capacitor, and a second input end of the FM transmitter module; a second end of the fifteenth capacitor is electrically connected to the second input end of the amplification and combination chip, and the second treble end outputs the signal of the first sound channel of the wireless module.

5. The audio processing circuit as recited in claim 4, wherein the treble adjustment subunit further comprises a fourth resistor and a fifth resistor;

a first end of the fourth resistor is electrically connected to the adjustable end of the first treble adjustable resistor, and a second end of the fourth resistor is electrically connected to the first input end of the amplification and combination chip;

a first end of the fifth resistor is electrically connected to the adjustable end of the second treble adjustable resistor, and a second end of the fifth resistor is electrically connected to the second input end of the amplification and combination chip.

6. The audio processing circuit as recited in claim 1, wherein the bass adjustment subunit comprises a sixteenth capacitor, a seventeenth capacitor, an eighteenth capacitor, a nineteenth capacitor, a first bass adjustable resistor, and a second bass adjustable resistor;

a first input end of the amplification and combination chip is electrically connected to an adjustable end of the first bass adjustable resistor, a first end of the sixteenth capacitor, and a first end of the seventeenth capacitor; a first bass end of the signal frequency division unit is electrically connected to a second end of the sixteenth capacitor and a first end of the first bass adjustable resistor; a first output end of the amplification and combination chip is electrically connected to a second end of the seventeenth capacitor and a second end of the first bass adjustable resistor, and the first bass end outputs a signal of a first sound channel of the wireless device;

a second input end of the amplification and combination chip is electrically connected to an adjustable end of the second bass adjustable resistor, a first end of the eighteenth capacitor, and a first end of the nineteenth capacitor; a second bass end of the signal frequency division unit is electrically connected to a second end of the eighteenth capacitor and a first end of the second bass adjustable resistor; a second output end of the amplification and combination chip is electrically connected to a second end of the nineteenth capacitor and a second end of the second bass adjustable resistor, and the second bass end outputs a signal of a second sound channel of the wireless device.

7. The audio processing circuit as recited in claim 6, wherein the bass adjustment subunit further comprises a sixth resistor, a seventh resistor, an eighth resistor, and a ninth resistor;

a first end of the seventh resistor is electrically connected to the first input end of the amplification and combination chip, and a second end of the seventh resistor is electrically connected to the adjustable end of the first bass adjustable resistor, the first end of the sixteenth capacitor, and the first end of the seventeenth capacitor; a first end of the sixth resistor is electrically connected to the first output end of the amplification and combination chip; a second end of the sixth resistor is electrically connected to the second end of the seventeenth capacitor and the second end of the first bass adjustable resistor;

a first end of the ninth resistor is electrically connected to the second input end of the amplification and combination chip, and a second end of the ninth resistor is electrically connected to the adjustable end of the second bass adjustable resistor, the first end of the eighteenth capacitor, and the first end of the nineteenth capacitor; a first end of the eighth resistor is electrically connected to the second output end of the amplification and combination chip, and a second end of the eighth resistor is electrically connected to the second end of the nineteenth capacitor and the second end of the second bass adjustable resistor.

8. The audio processing circuit as recited in claim 1, wherein the midrange adjustment subunit comprises a twentieth capacitor, a twenty-first capacitor, a twenty-second capacitor, a twenty-third capacitor, a twenty-fourth capacitor, a twenty-fifth capacitor, a first midrange adjustable resistor and a second midrange adjustable resistor;

a first midrange end of the signal frequency division unit is electrically connected to a first end of the twenty-third capacitor and a first end of the first midrange adjustable resistor; a first input end of the amplification and combination chip is electrically connected to a second end of the twenty-third capacitor, a first end of the twenty-fourth capacitor, and an adjustable end of the first midrange adjustable resistor; a first end of the twenty-fifth capacitor is electrically connected to a second end of the twenty-fourth capacitor and a second end of the first midrange adjustable resistor; and a second end of the twenty-fifth capacitor is electrically connected to a first output end of the amplification and combination chip;

a second midrange end of the signal frequency division unit is electrically connected to a first end of the twentieth capacitor and a first end of the second midrange adjustable resistor; a second input end of the amplification and combination chip is electrically connected to a second end of the twentieth capacitor, a first end of the twenty-first capacitor, and an adjustable end of the second midrange adjustable resistor;

a first end of the twenty-second capacitor is electrically connected to a second end of the twenty-first capacitor and a second end of the second midrange adjustable resistor; a second end of the twenty-second capacitor is electrically connected to the second output end of the amplification and combination chip.

9. The audio processing circuit as recited in claim 8, wherein the midrange adjustment subunit further comprises a tenth resistor and an eleventh resistor;

a first end of the tenth resistor is electrically connected to the first input end of the amplification and combination chip; a second end of the tenth resistor is electrically connected to the second end of the twenty-third capacitor, the first end of the twenty-fourth capacitor, and the adjustable end of the first midrange adjustable resistor;

a first end of the eleventh resistor is electrically connected to the second input end of the amplification and combination chip; a second end of the eleventh resistor is electrically connected to the second end of the twentieth capacitor, the first end of the twenty-first capacitor, and the adjustable end of the second midrange adjustable resistor.

10. The audio processing circuit as recited in claim 9, wherein the midrange adjustment subunit further comprises a twelfth resistor and a thirteenth resistor;

two ends of the twelfth resistor are respectively electrically connected to the second end of the twenty-fourth capacitor and the first output end of the amplification and combination chip;

two ends of the thirteenth resistor are respectively electrically connected to the second end of the twenty-first capacitor and the second output end of the amplification and combination chip.

11. The audio processing circuit as recited in claim 1, wherein the treble adjustment subunit synchronously adjusts high frequency signals of all sound channels, and the bass adjustment subunit synchronously adjusts low frequency signals of all sound channels, and the midrange adjustment subunit synchronously adjusts intermediate frequency signals of all sound channels.

12. The audio processing circuit as recited in claim 1, wherein the first processing submodule further comprises a twenty-sixth capacitor and a twenty-seventh capacitor;

a first end of the twenty-sixth capacitor is electrically connected to a first output end of the amplification and combination chip, and a second end of the twenty-sixth capacitor is electrically connected to a first input end of the FM transmitter module;

a first end of the twenty-seventh capacitor is electrically connected to a second output end of the amplification and combination chip; a second end of the twenty-seventh capacitor is electrically connected to a second input end of the FM transmitter module.

13. The audio processing circuit as recited in claim 1, wherein the audio processing module is a digital signal processor (DSP) chip.

14. The audio processing circuit as recited in claim 1, wherein the FM transmitter module comprises a FM transmitter submodule, a twenty-eighth capacitor, a twenty-ninth capacitor, a fourteenth resistor, and a fifteenth resistor;
   a first end of the twenty-ninth capacitor is electrically connected to a first output end of the audio processing module for receiving a signal of a first sound channel, and a second end of the twenty-ninth capacitor is electrically connected to a first end of the fifteenth resistor, and a second end of the fifteenth resistor is electrically connected to a first input end of the FM transmitter submodule;
   a first end of the twenty-eighth capacitor is electrically connected to a second output end of the audio processing module for receiving a signal of a second sound channel, and a second end of the twenty-eighth capacitor is electrically connected to a first end of the fourteenth resistor; a second end of the fourteenth resistor is electrically connected to a second input end of the FM transmitter submodule.

15. A car-mounted player comprising an audio processing circuit,
   the audio processing circuit comprising:
      a signal acquisition module comprising a wireless input module and/or a wired input module, the wireless input module is configured to receive an audio signal based on a wireless technology, and the wired input module is configured to receive the audio signal based on a wired technology;
      an audio processing module, configured to process the audio signal received by the signal acquisition module to improve sound quality of the audio signal;
      a frequency modulation (FM) transmitter module, configured to perform FM transmission on the audio signal output by the audio processing module;
      a power supply module, configured to supply power to the signal acquisition module, the audio processing module and the FM transmitter module;
      wherein the wireless input module includes a wireless module, and the wireless module is configured to receive the audio signal based on a wireless technology;
      the audio processing module comprises a first processing submodule;
      the first processing submodule comprises a signal frequency division unit, a frequency division adjustment unit, and an amplification and combination unit;
      the signal frequency division unit is electrically connected to the power supply module and the wireless module, and the signal frequency division unit is configured to perform frequency division of the audio signal received by the wireless module;
      the frequency division adjustment unit comprises at least one of a treble adjustment subunit, a bass adjustment subunit, and a midrange adjustment subunit; the treble adjustment subunit is configured to adjust a high frequency signal obtained by a frequency division of the signal frequency division unit, and the bass adjustment subunit is configured to adjust a low frequency signal obtained by the frequency division of the signal frequency division unit, and the midrange adjustment subunit is configured to adjust an intermediate frequency signal obtained by the frequency division of the signal frequency division unit;
      the amplification and combination unit comprises an amplification and combination chip and a voltage division subunit, the amplification and combination chip is electrically connected to the frequency division adjustment unit, the FM transmitter module, and the power supply module; the amplification and combination chip is configured to amplify and combine signals output by the frequency division adjustment unit, and output the signals to the FM transmitter module;
      the voltage division subunit comprises a first resistor, an eighth pin of the amplification and combination chip is electrically connected to a first end of the first resistor, and a second end of the first resistor is electrically connected to the power supply module, the eighth pin of the amplification and combination chip is configured to provide a reference power supply.

16. A wireless playback system comprising an audio processing circuit, the audio processing circuit comprising:
   a signal acquisition module comprising a wireless input module and/or a wired input module, the wireless input module is configured to receive an audio signal based on a wireless technology, and the wired input module is configured to receive the audio signal based on a wired technology;
   an audio processing module, configured to process the audio signal received by the signal acquisition module to improve sound quality of the audio signal;
   a frequency modulation (FM) transmitter module, configured to perform FM transmission on the audio signal output by the audio processing module;
   a power supply module, configured to supply power to the signal acquisition module, the audio processing module and the FM transmitter module;
   wherein the wireless input module includes a wireless module, and the wireless module is configured to receive the audio signal based on a wireless technology;
   the audio processing module comprises a first processing submodule;
   the first processing submodule comprises a signal frequency division unit, a frequency division adjustment unit, and an amplification and combination unit;
   the signal frequency division unit is electrically connected to the power supply module and the wireless module, and the signal frequency division unit is configured to perform frequency division of the audio signal received by the wireless module;
   the frequency division adjustment unit comprises at least one of a treble adjustment subunit, a bass adjustment subunit, and a midrange adjustment subunit; the treble adjustment subunit is configured to adjust a high frequency signal obtained by a frequency division of the signal frequency division unit, and the bass adjustment subunit is configured to adjust a low frequency signal obtained by the frequency division of the signal frequency division unit, and the midrange adjustment subunit is configured to adjust an intermediate frequency signal obtained by the frequency division of the signal frequency division unit;
   the amplification and combination unit comprises an amplification and combination chip and a voltage division subunit, the amplification and combination chip is electrically connected to the frequency division adjustment unit, the FM transmitter module, and the power supply module; the amplification and combination chip is configured to amplify and combine signals output by the frequency division adjustment unit, and output the signals to the FM transmitter module;

the voltage division subunit comprises a first resistor, an eighth pin of the amplification and combination chip is electrically connected to a first end of the first resistor, and a second end of the first resistor is electrically connected to the power supply module, the eighth pin of the amplification and combination chip is configured to provide a reference power supply.

* * * * *